Aug. 7, 1928.　　　　　　　　　　　　　　　　　1,679,350
C. T. DICKEY
MACHINE FOR EXTRUDING TUBULAR ARTICLES
Filed Jan. 26, 1926　　　2 Sheets-Sheet 1
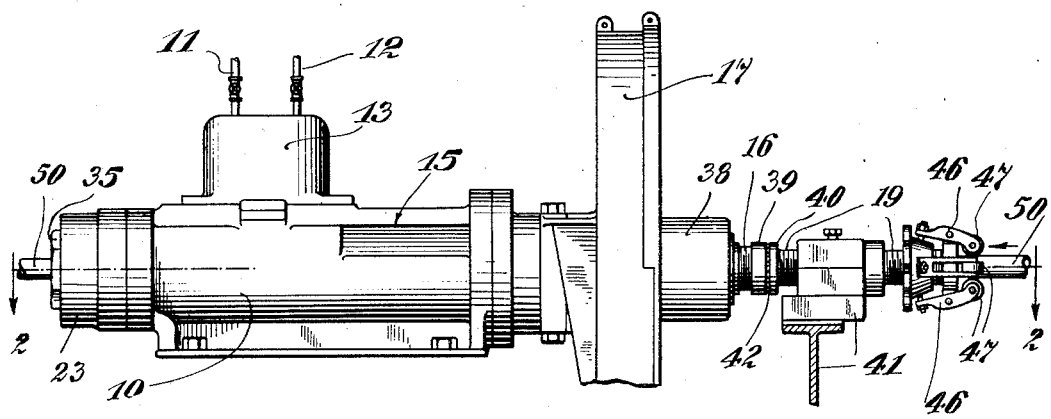
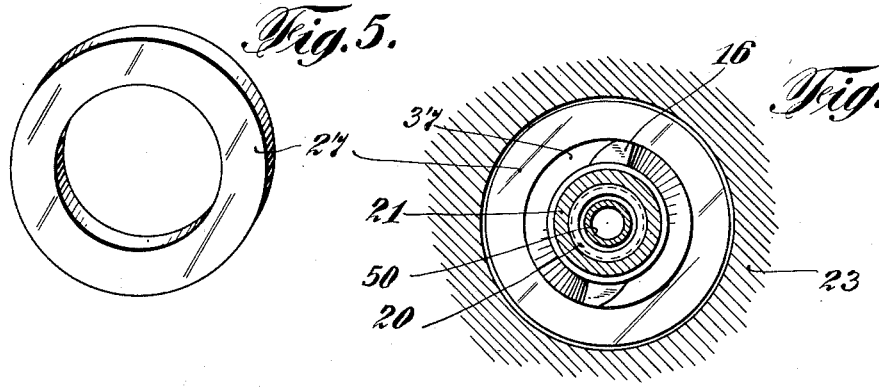
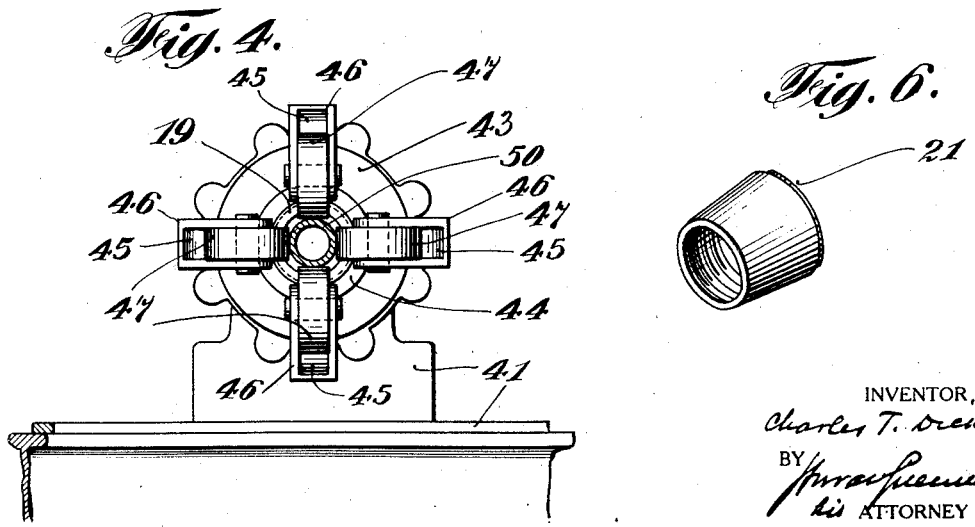
INVENTOR,
Charles T. Dickey
BY
his ATTORNEY

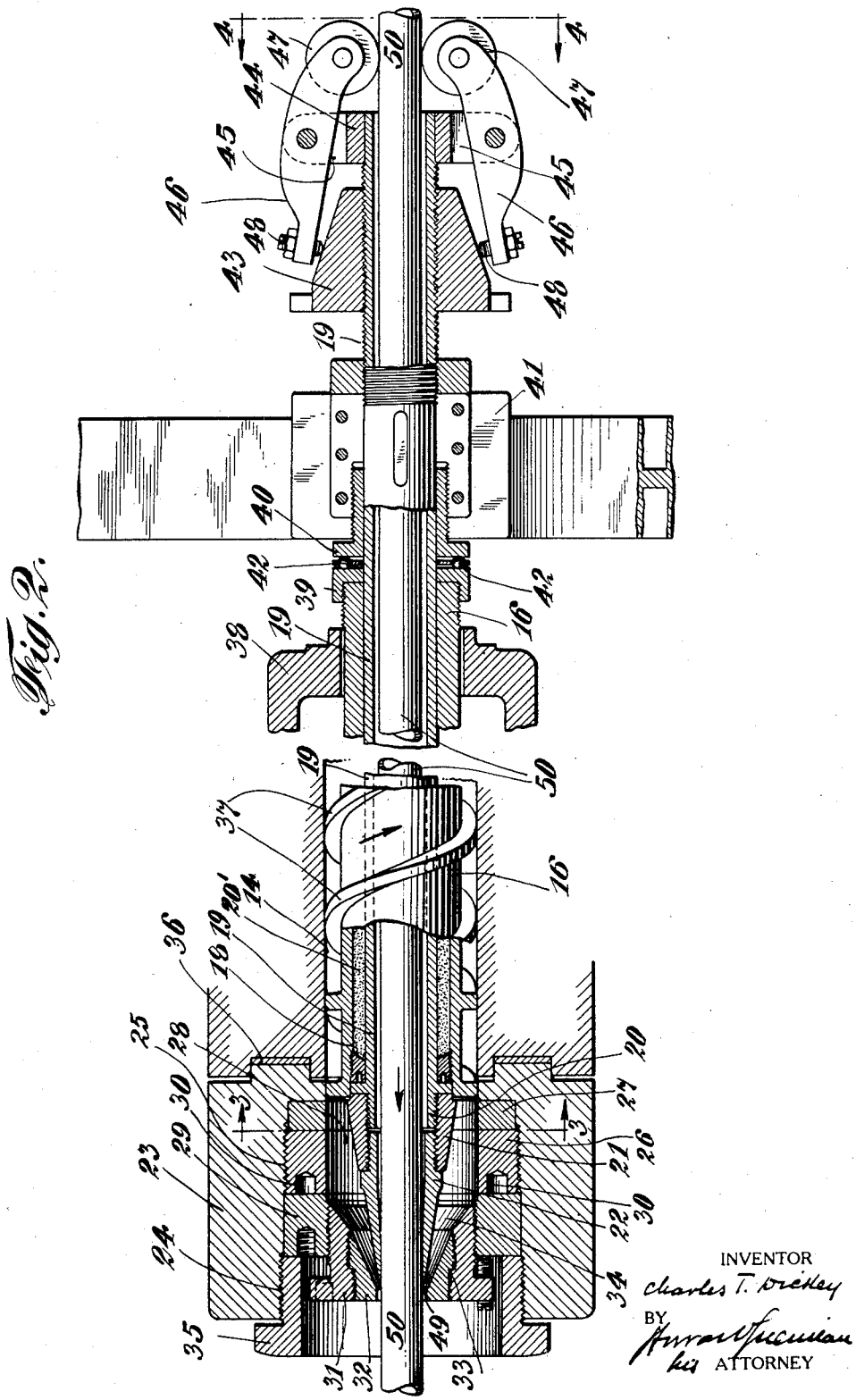

Patented Aug. 7, 1928.

1,679,350

UNITED STATES PATENT OFFICE.

CHARLES T. DICKEY, OF ELIZABETH, NEW JERSEY, ASSIGNOR TO RODIC RUBBER COMPANY, OF GARWOOD, NEW JERSEY, A CORPORATION OF NEW JERSEY.

MACHINE FOR EXTRUDING TUBULAR ARTICLES.

Application filed January 26, 1926. Serial No. 83,937.

My invention relates to a process for the production of devices from plastic material and machines for the production of the same and refers particularly to processes for the production of hollow tubular devices from plastic material and machines for the production of such devices.

Without limiting myself to plastic rubber compositions or to the production of typewriter platens, I will describe this particular process and device, in order that my invention may be understood.

Typewriter platens must have uniformly smooth surfaces, free from lines, or striations, in order that the type impressions may be clear and distinct, and the production of such platens has been found extremely difficult, if not impossible, by the present known processes and machines.

I have found that the striations found upon such platens are due to the fact that the present employed machines have supporting bars, or spider legs, extending transversely across the chamber between the delivery end of the feed screw and the discharge end of the die, thus separating the plastic mass and interrupting its uniform mass construction during its flow, and that this mass separation, even if effected some distance from the discharge end of the die, causes striations to appear upon the platen corresponding to these bars or spider legs.

I have overcome this objectionable feature by employing a process and a machine in which the flow of the plastic mass is uniform and the mass unseparated, or uninterrupted, from the delivery end of the feed screw to its deposition upon a mandril.

A further element of my machine invention is a means for centering the mandril within the device. This is particularly valuable in that mandrils of different diameters are necessary in the production of platens of different diameters and these mandrils must be accurately centered, in order to produce operative platens.

These and other valuable properties and characteristics of my invention will be evident upon a consideration of my specification and the accompanying drawings.

In the accompanying drawings illustrating one form of the device of my invention, similar parts are designated by similar numerals.

Figure 1 is a side view of one form of the device of my invention.

Figure 2 is a cross-section through the line 2—2 of Figure 1.

Figure 3 is a cross-section through the line 3—3 of Figure 2.

Figure 4 is a cross-section through the line 4—4 of Figure 2.

Figure 5 is a perspective view of one of the collars of the delivery end of the device.

Figure 6 is a perspective view of a conical nozzle of the delivery end of the device.

The particular form of the device of my invention shown in the accompanying drawings comprises an inter-chamber cylinder 10 which may be maintained at a predetermined temperature by the passage of steam or water through the steam pipe 11 and the water pipe 12, thence through the chest 13 and thence through inter-connected diameters within the cylinder 10.

The cylinder 10 has an interior bore 14 passing therethrough, having an opening, or throat, 15 opening exteriorly, in order that the plastic material may be introduced therethrough into the cylinder bore.

Within the cylinder bore 14 is a revoluble feed screw, or stock worm, 16, carrying a double flute 37, 37, the pitch of which decreases from the feeding head to the discharge head of the device, thus causing an increased pressure of the material at the discharge end. The revolving mechanism for the stock worm 16 is enclosed in the casing 17, but not shown in detail as it is not the subject matter of this invention, any well known revolving means being adapted for this purpose.

The stock worm 16 has an internal bore 18, within which is a non-revoluble bushing 19, a tight jointure between the stock worm 16 and the bushing 19 being accomplished by packing 20'.

The delivery end of the bushing 19 has an externally threaded extended member 20, upon which is threaded the hollow cone nozzle 21, the interior face of which is threaded to receive the externally threaded hollow die 22.

A hollow delivery head 23 has two internally threaded portions 24 and 25.

Threaded within the portion 25 of the delivery head 23 is an externally threaded collar 26, forming the chamber 27, and between the collar 26 and the inner end face of the delivery head 23 is a collar 27. The collars 26 and 27 thus form a chamber 28.

Exteriorly of the collar 26 is a collar 29 the pins 30, 30 of which enter corresponding recesses in the collar 26.

Threaded within the inner face of the collar 29 is a collar 31, carrying the collar 32 by means of the shoulder 33.

The inclined inner faces of the collars 31 and 32 form a cone allowing a passage between the face of the collar 32 and the end of the die 22 and at the same time form the chamber 34.

A hollow member 35 threads within the part 24 of the head 23.

Packing 36 allows of a tight jointure between the delivery head 23 and the cylinder 10.

It will be seen from the above that the delivery end of the device may be readily assembled to co-operate with any desired size or shape of die by the proper employment of co-acting parts.

In order to take up the thrust of the worm screw 16, it is extended through the stationary housing 38 within which it is revoluble. An angular ring 39 is threaded upon the extremity of the screw 16, the ring 39 having a ball runway within its one face. An angular collar 40 is threaded within the support 41 and has a ball run-way within its face corresponding with the run-way of the ring 39, bearing balls 42, 42 being therein.

A centering device for the mandril 50, which extends through and is movable through the device, comprises a collar 43 threaded upon the member 19. Fixedly carried by the member 19 is a ring, or collar, 44, having four extended U-shaped arms 45, 45, 45, 45. Pivotally carried by each arm 45 is an idler-carrying arm 46 upon one end of which is the revoluble idler 47 and within the other end of which is an adjustable set screw 48. By adjusting the set screws 48, 48 and turning the collar 43, the mandril 50 may be accurately centered.

The operation of the machine in the formation of hollow tubular devices, as typewriter platens, from plastic rubber compositions, is as follows:—

When the proper die is inserted and fixed in position, the plastic rubber is inserted in the throat of the machine during the revolution of the feed screw which conveys the plastic material through the cylinder toward the discharge end. The material is thus forced in a practically uniform mass through the chambers 28 and 34 and outwardly of the opening 49 upon the exterior surface of the mandril 50 which is moving longitudinally through the machine, thus forming an exterior coating of material of practically uniform thickness upon the mandril. The rubber composition thus deposited is vulcanized upon the mandril and then removed therefrom, thus forming a hollow rubber tube, or platen.

It is to be particularly noted that the body of plastic material passes in the form of a uniform uninterrupted mass from the exit end of the feed screw into and through the die and upon the mandril, and that there are no supporting members, or spider legs, interposed across the flow of material to divide it or interrupt its uniform formation.

This particular feature of my device is of the greatest practical value and importance, as it allows of a uniform deposition of the material mass upon all portions of the mandril, thus preventing the formation of longitudinal striations incident to the use of a machine in which the mass is separated, or interrupted, during its passage from the feed screws to the mandril.

It is evident that hollow tubes of different diameters with different thickness of plastic material may be produced dependent upon the construction and size of the die and mandril, both of which later may be readily changed without interfering with the other elements of the device.

What I claim is:—

In a machine for the production of hollow tubular devices from plastic materials, in combination, a hollow feed worm, a die positioned at the delivery end of the worm, a plurality of assembled collars exterior of the die and spaced therefrom forming an uninterrupted chamber between the feed worm and the delivery end of the die, a longitudinally movable mandril within the worm, a plurality of pivoted centering members, an idler carried by each centering member capable of abutment upon the mandril and means carried by each centering member for determining the inclination of the centering member with respect to the mandril.

Signed at New York city, in the county of New York and State of New York, this 21st day of January, 1926.

CHARLES T. DICKEY.